June 19, 1951
E. M. CALLENDER
2,557,906
SYSTEM OF MODULATED ROOM AND WINDOW HEATING
Filed March 20, 1948
3 Sheets-Sheet 1
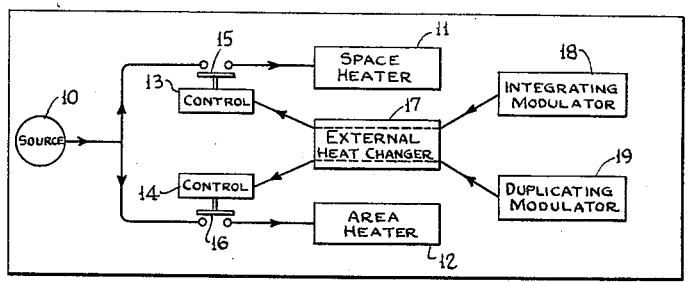
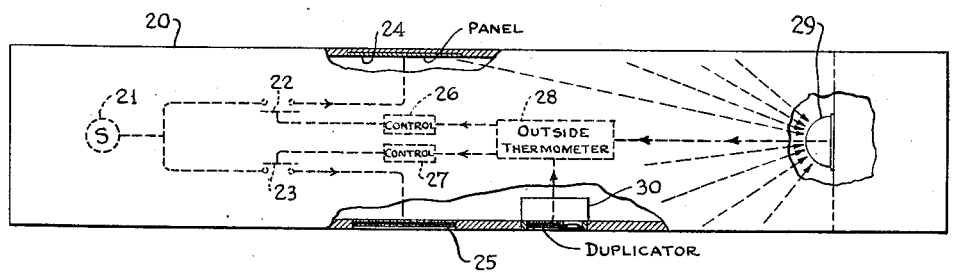
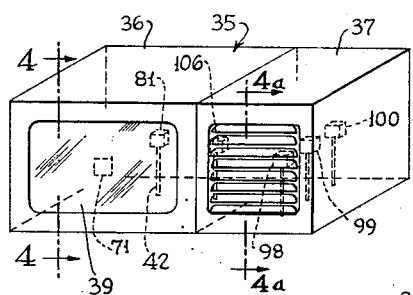
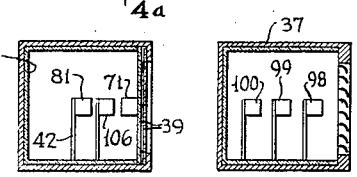
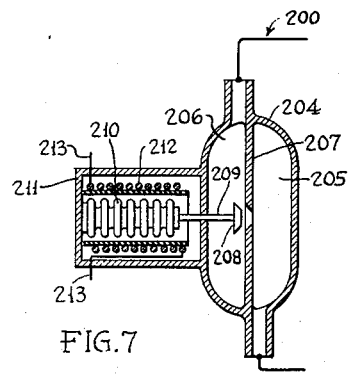
INVENTOR.
EDWIN M. CALLENDER
BY Maurice A. Crews
ATTORNEY

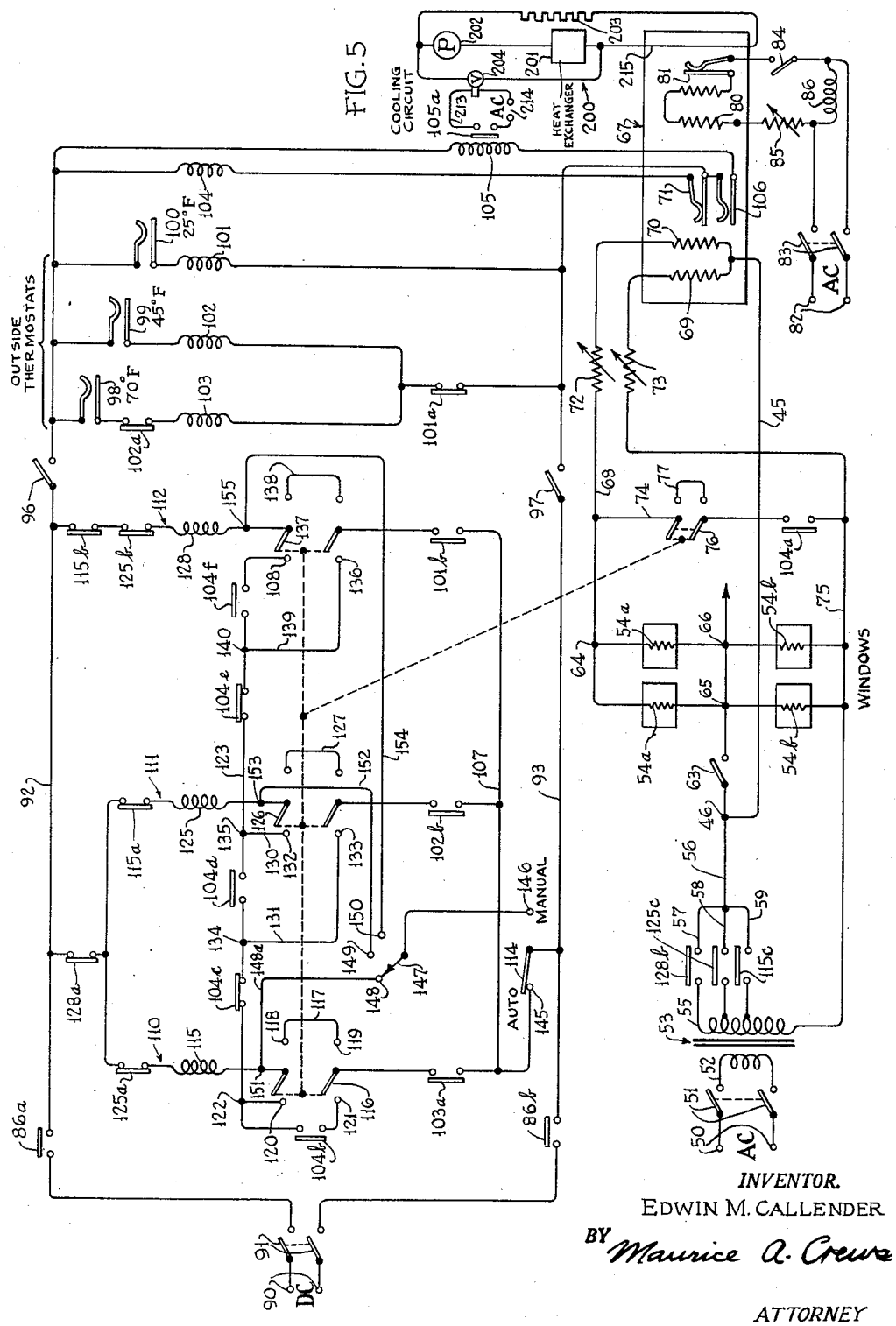

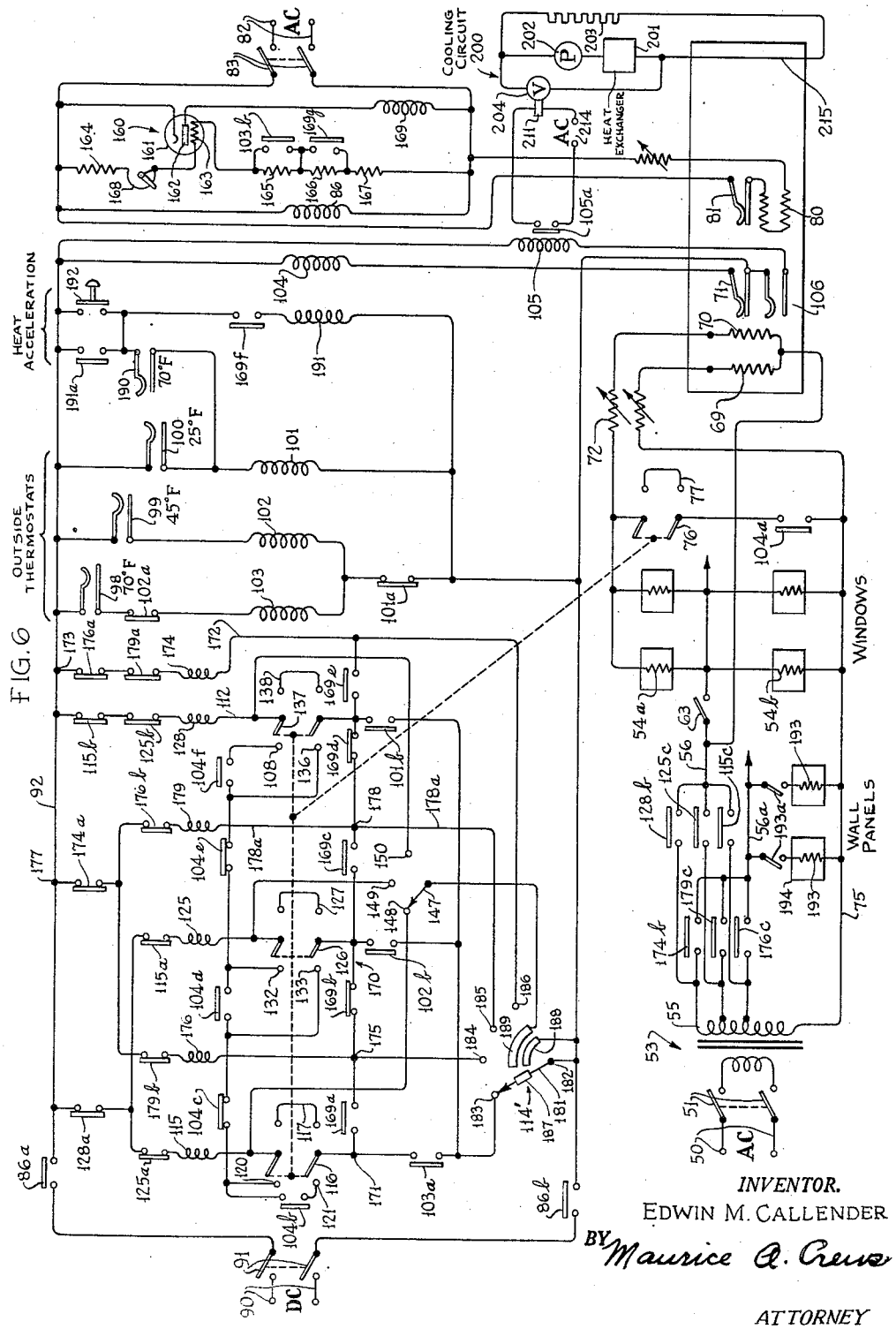

Patented June 19, 1951

2,557,906

UNITED STATES PATENT OFFICE 2,557,906

SYSTEM OF MODULATED ROOM AND WINDOW HEATING

Edwin M. Callender, Cynwyd, Pa., assignor to The Budd Company, Philadelphia, Pa., a corporation of Pennsylvania Application March 20, 1948, Serial No. 16,003

11 Claims. (Cl. 257—3)

This invention relates to room heating with special reference to the heating of windows with modulation of both room space and window heating at various values of external temperatures.

In my copending application, Serial No. 692,332, filed August 22, 1946, now Patent No. 2,519,109, I have shown and described a system of heating, giving a substantially uniform variation between predetermined ranges of temperature for electrically heated panels in the walls of the enclosure. In this prior system of heating, accessory heating means for areas, such as windows, are indicated, the control for the window heating being automatic by means of a thermostat at each window to turn the heating current on and off at predetermined selected temperature values. The employment of controls at each of a large number of windows in the wall of an enclosure, such as a railway car, is not only costly but involves troublesome problems of control and introduces unsightly apparatus which may obstruct window vision.

It is an outstanding object of the invention to provide a single control unit effective on all windows of an enclosure. An object also is to provide window control apparatus which may be installed so as not to obstruct window vision. Another object is to secure area or window temperature modulation which is variable in extent as desired to accommodate for external temperature changes. An object also is to provide a type of area temperature modulation control which may be made substantially independent of the location of the control space. An important object of the invention is to provide a novel means for temperature control which is susceptible of use not only for area heating, but for general space heating within an enclosure.

Other objects of the invention pertain to the specific structural arrangements of a duplicator for establishing area modulation; to means for combining surface or area and space or chamber temperature controls for an enclosure; to provide satisfactory modulating and temperature control means for windows which need not be applied as a structual unit upon the window itself, so that the clarity of vision through the window is maintained; and to provide a temperature control unit which is capable of use not only for controlling room temperatures when the external temperature is normally low, but also when the external temperature is normally high, according to conditions existing in winter and summer.

Reference is made to the following description of a preferred embodiment of the invention and to the accompanying drawings, in which:

Figure 1 is a diagram indicating the general control operation of the system;

Figure 2 is a diagram indicating specific application to railway car use;

Figures 3, 4 and 4a are views of a perspective and vertical section respectively, of the duplicator control unit;

Figure 5 is a wiring diagram illustrating control circuits and apparatus for window area heating;

Figure 6 is a wiring diagram illustrative of circuits 25 and apparatus for application to combined panel and window heating; and Figure 7 is a detail of the valve structure in the refrigerating circuit, as shown in Fig. 5.

Reference is made to Fig. 1 for a general description of the substance of the invention. In the diagram of this figure there is indicated a source 10 of heat, such as an electric generator, which supplies power to the space heater 11 of the enclosure and the area heater 12. The space heater may take the form of a plurality of resistance elements inserted in panels placed at strategic points throughout the wall of the enclosure, such as a railway car. The area heater may be any restricted area, such as a window, which is subjected to different specific conditions of control than may be applicable to the general room space of the enclosure. For example, in the case of a railway car, the window may be closely beside a seat so that the seat occupant is subpected to temperature conditions which are limited to this specific area rather than to the general average heat conditions of the interior of the car.

In the case of both the space and area heaters, controls are employed to introduce the heating power and to permit modulation means to be effective. The control for the space heater is indicated by the numeral 13 and that for the area heater by the numeral 14. These controls include switches 15 and 16. These control means are subject to external temperature conditions, such as may be obtained by use of a plurality of external thermometers or thermostats, each operative at different temperatures to close or open circuits to the controls 13 and 14. At lower temperatures, for example in winter heating, greater supplies of power are secured. This external heat changer is indicated by the numeral 17. Finally, as affecting the various stated stepped temperatures secured by the external heat changer are modulating means for each stepped value and for each of the separate heater controls. There is supplied, as indicated, an integrating modulator 18 which modifies the general space temperature at any given stepped value of the external temperature within certain predetermined limits. There is also provided what is called a duplicating modulator 19 which functions independently of the integrating modulator to modulate the temperature for any stepped value of the external temperature at the specific heated areas of the enclosure. Two types of modulation are provided, one being a shift from one value to another of heating voltage and the other being a partial shift, some heating elements being cut on and off and others being continuously kept on.

In Fig. 2 is illustrated a specific adaptation of the system to a room or enclosure, such as a railway car. This diagram follows the general form of Fig. 1, reference being made to the enclosure 20, the power source 21, switches 22 and 23, the panel heater 24, the window heater 25, the various controls 26 and 27, the external thermometer controls 28, the so-called radiastat 29 for integrating space interior temperature and assisting in controlling the space heating panels, and the duplicator 30 for assisting in controlling the window or area heaters.

Figs. 3, 4 and 4a illustrate structurally the duplicator of Fig. 2. As shown, the duplicator is in the form of a box 35 which is in two sections 36 and 37. Section 36 is the duplicator, proper. Section 36, by insulation 38 (Fig. 4), is insulated on all sides except the outer side, the outer side having single or double panes of glass 39 for the outer wall thereof, in general duplication of the windows of the car. The compartment 37 also has insulated walls and is provided with a protecting screen or louvers 40 on the front side where exposed exteriorly. In both of the sections 36 and 37 are placed thermostats. In section 36 a thermostat 71 is placed adjacent the inner surface of the inner pane of glass approximately at the center of area thereof, as shown, for the purpose of registering glass temperature conditions at this point within the compartment 36. Supported on standard 42 is a second thermostat 81 intended to register temperature conditions of the atmosphere within the box. In the compartment 37, exposed to outside conditions, there are three thermostats 98, 99 and 100, which are intended to operate for different specified outside temperatures as will be more fully described hereinafter. This box 35 of unit 30 may be placed in the wall of the enclosure at any desired point, such as one of the side walls or the roof of the enclosure, the glass window and louver openings of the unit being exposed to the external atmosphere and consequently being subject to outside temperature conditions.

In order to simplify the description of the circuits employed to utilize the specific method or system of heat control and modulation, circuit means restricted to area or window heating will first be described, following Fig. 5. In this figure a source of heating power is indicated at 50 for transmitting current through the main switch 51 to the primary 52 of heating or power transformer 53. The windows to be heated are preferably of the double-pane type as shown in Fig. 2, and the heating elements therefor are placed on the outer surface of the inner pane (on the side facing the outer pane), as a transparent metallic film or very fine metallic strips, in either case, the resistance of the conductors being such as to impart heat to the pane on flow of current therethrough. Preferably, also the heating elements are divided for each window so that there are two groups of resistors indicated in the drawing at 54a and 54b (preferably in spaced vertical parallel planes or interspersed) so that it is possible to utilize both groups of heaters or a single group and thereby secure a modulation of the current supply to the window and hence of the heating effect. These resistors receive current from the heating transformer 53 through the secondary coil 55 and a common conductor 56, there being interposed in the circuit several parallel branches or taps as 57, 58 and 59, each of which has connection to a different tapped point on the secondary coil of the transformer and is provided with relay switches as 128b, 125c and 115c. By this means the appropriate amount of current may be supplied to the resistors through any one of the branch tapped circuits 57, 58 and 59 to secure different voltage. A manual switch 63 is placed also in the circuit of conductor 56 whereby to cut the windows or any of them in or out.

Figure 5 illustrates circuit arrangements through which two modulation effects of the current supply to the windows may be secured. By one of these effects, temperature modulation is secured by shifting window resistances in part. Another arrangement secures modulation of the heating current only.

Reference will first be made to the lower portion of Fig. 5 and the first type of modulation will be described. At points 65 and 66 on power main 56 parallel conductors extend through the two resistors 54a to junction point 64 and to circuit elements within the window box or duplicator 67 by way of conductor 68. Inside this box there are located two resistors 69 and 70 and, as described with reference to Figs. 3 and 4, a normally closed fixed temperature thermostat 71, the thermostat being positioned adjacent the resistors so as to be opened by heat supplied from the resistors. This thermostat corresponds to the unit 71, as shown structurally in Fig. 3 of the drawing. Both of these resistors are connected by conductor 45 to point 46 on conductor 56 between the manual switch 63 and the relay switches 128b, 125c and 115c. The resistor 70 is connected to the conductor 68 and window resistors 54a through the variable adjusting resistor 72. Resistor 69 is connected by conductor 75 through the variable resistor 73 to a terminal of the heating transformer secondary 55 and to one side of the resistors 54b. The resistors 54b also have connection to the points 65, 66 on transformer conductor 56 so as to establish a circuit therethrough to the transformer in parallel to the resistors 54a. It accordingly appears that on closure of manual switch 51 and any one of relay switches 115c, 125c or 128b, heating current will be supplied to resistors 54b in the window box 67. Also by supplying a return conductor 74 from conductor 68 to the transformer conductor 75, power may be supplied to the resistors 54a subject to closure of manual switch 76 on its shunt 77 and relay switch 104a in series in the conductor 74. It is apparent that when one or both of these switches are open, only the one set of window resistors 54b is effective for heating, but that on closure thereof, both sets of resistors 54a and 54b are effective in parallel for window heating.

Also enclosed in the duplicator 67 is a resistor unit 80 and a second normally closed fixed temperature thermostat 81 adjacent thereto corresponding to the thermostat 81 of Fig. 4. The placement of this thermostat in the central space of the duplicator and the supply of current to the resistor 80 is such as to maintain the duplicator of the box interior substantially at a predetermined temperature of comfort as determined by experience. Supply of power to the resistor 80 is derived from the alternating current source 82 through manual switches 83 and 84 and variable resistor 85. A relay coil 86 is connected in parallel with a resistor circuit for operating the main control switches 86a, 86b, presently to be described.

The circuit shown in the upper portion of Fig. 5 will now be described. A source 90 of direct current, at 32 volts, for example, supplies current through the manual switch 91 to main conductors 92 and 93 through relay switches 86a and 86b operable by the relay coil 86 of the circuit supplying the resistor 80 of the duplicator. Conductors 92 and 93 lead current through manual switches 96 and 97 to three fixed temperature thermostats 98, 99 and 100 connected in parallel across the main circuit. These thermostats are adapted for positioning in the compartment 37 so as to be susceptible to outside temperatures, and are normally open at elevated temperatures. On a falling temperature the thermostats close successively, for example, thermostat 98 closing at 70° F., thermostat 99 closing at 45° F. and thermostat 100 at 25° F. Fig. 3 illustrates one mode of mounting these thermostats as in compartment 37 of the window box unit 35 with access to outside air circulation and temperature. Relay 101 is connected in series with thermostat 100. Relay 102 is connected in series with thermostat 99 and normally closed relay switch 101a. Relay 103 is connected in series with thermostat 98, as well as normally closed relay switches 101a and 102a. Consequently, thermostat 98 is dependent for operation upon closure of relay switch 102a and both thermostats 98 and 99 are dependent for supply of current through the circuits upon closure of relay switch 101a.

Also included in the circuit 92, 93 in parallel with the thermostats 98, 99 and 100 are relays 104 and 105. Relay 104 includes in series the duplicator thermostat 71 and relay 105 the normally open fixed temperature thermostat 106 which functions with relay 105 in a cooling circuit, later to be described. Relay 104 operates relay switch 104a in the power circuit conductor 74 of window resistors 54a. Relay 104 also operates switches 104b, 104c, 104d, 104e and 104f, presently to be described. Relay 105 actuates the control switch 105a of the cooling circuit.

Connected across main conductors 92 and 93 is a group of parallel branch circuits indicated generally by numerals 110, 111 and 112. Branch circuits 110 and 111 form a series-parallel connection in that both circuits include a common normally closed relay switch 128a connecting to the conductor 92 and a manual switch 114 connecting to the conductor 93. Intermediate these two switches are the branched circuits 110 and 111. Circuit 110 includes the normally closed relay switch 125a, the relay coil 115, manual switch 116, short-circuiting conductor 117, and normally opened relay switch 103a. The manual switch 116 is adapted to engage terminals 118 and 119 of the short circuit 117 as one form of connection. A reversal of the switch to terminals 120 and 121 establishes a connection of branch circuit 110 from the relay 115 through the upper arm of the switch 116, terminal 120, normally opened relay switch 104b, the lower arm of switch 116, and relay switch 103a to the main 93. Also at point 122 in this circuit, a conductor 123 is connected leading to terminal 108 of manual switch 137 in circuit 112, this conductor including, in series, the relay switches 104c, 104d, 104e and 104f. Switches 104c and 104e are normally closed and switches 104d and 104f are normally opened.

Branch circuit 111 includes normally closed relay switch 115a, relay 125, manual switch 126, short circuit 127, normally opened relay switch 102b, as well as the previously mentioned switches 128a and 114. Parallel circuit 112 includes the relay coil 128, normally closed relay switches 115b and 125b and normally opened relay switch 101b and manual switch 137 with short circuit 138. The relay switches 103a, 102b and 101b are connected together by conductor 107 and to the manual switch 114 so as to make the manual switch effective on all three circuits.

Circuit 111 is also provided with the alternative circuit including conductors 130 and 131 connecting terminals 132 and 133 of the switch 126 to points 134 and 135 on opposite sides of the normally opened relay switch 104d. Circuit 112 also has alternative connection from the terminal 136 of switch 137 through conductor 139 to point 140 between switches 104e and 104f.

It is pointed out that manual switches 116, 126 and 137 and also manual switch 76 in the duplicator circuit are physically connected, as indicated by the broken lines, so that the various short circuit connections of these switches are made simultaneously. Alternatively the reverse connections open duplicator switch 76 and close switches 116, 126 and 137 on alternative circuits for obtaining of simple voltage modulation of the apparatus.

The circuit, as above described, covers the main essentials thereof. However, there is utilized manual switches and circuits to provide alternative control means in case of failure of the automatic control. Reference is made to the manual switch 114 connected on the pivot side to main conductor 93. This switch is provided with two contacts, the terminal 145 constituting the automatic connection and the terminal 146, the manual connection. Terminal 146 is connected directly to a three-way manual switch 147 having three contacts 148, 149 and 150. Terminal 148 bypasses the modulating apparatus through conductor 148a connecting the relay 115 at point 151. Switch contact 149 of the manual switch 147 is connected by conductor 152 to point 153 between the relay 125 and switch 126. Terminal 150 is connected by conductor 154 to point 155 intermediate the relay 128 and switch 137 in circuit 112. By this switch means, emergency operation of the apparatus may be maintained without the automatic voltage modulating controls or outside thermostats.

The discussion will now be directed to the operation of the circuit and apparatus and in doing so, several general assumptions may be made. The manual switches, including the main heat source switch 51, heating line switch 63, duplicator heater switches 83 and 84 are closed (energizing relay 86 and closing its switches 86a, 86b); and switch 91 and the grouped switches 76, 116, 126 and 137 are also closed to the right, engaging the short circuit terminals. Also manual switch 114 is closed on terminal 145 to permit automatic operation, and main switches 96 and 97 to the thermostat circuit are closed. It may be assumed further that four conditions may be investigated; a, temperature outside above 70° F. and temperature inside above 70° F.; b, temperature outside above 70° F. and temperature inside below 70° F.; c, temperature outside below 70° F. and temperature inside above 70° F.; and d, temperature outside below 70° F. and temperature inside below 70° F.

In the a condition (both inside and outside over 70° F.) external thermostats 98, 99 and 100 are all open so that relays 103, 102 and 101 are deenergized. Consequently relay switches 103a, 102b and 101b are all open, relays 115, 125 and 128 in branch circuits 110, 111 and 112 are deenergized and the power circuit relay switches 115c, 125c and 128b are all open. Relay switches 101a, 115a, 115b, 125a, 125b and 128a are closed. Simultaneously resistor 80, in the duplicator, supplying heat to the enclosure and to thermostat 81 for normal enclosure temperature, is augmented by external temperatures so that thermostat 81 opens to take current off resistor 80. Also thermostat 71 is closed due to the fact that resistors 69 and 70 and box-heating resistor 80 are not supplying heat. Relay 104 is energized since thermostat 71 is closed, thereby closing switch 104a in conductor 74; but since there is no power in the circuit of the power lines 56, 75 or conductor 74, this has no effect on the supply of current to the duplicator resistors 69 and 70. Accordingly, under condition $a$, no heat supply to the windows occurs.

In the $b$ condition (outside above, inside below 70° F.) the result is identical to the $a$ condition because, while the inside thermostat 81 remains closed, the external thermostats remain open with the effect just described.

In the $c$ condition, with the external temperature below 70° and the internal temperature above 70°, thermostat 81 is open, thermostat 71 is closed, and external thermostat 98 is closed thereby energizing relay 103 and closing switch 103a in circuit 110. Accordingly, relay 115 in the 110 circuit is energized, closing switch 115c. Whereupon the transformer 53 at its low voltage tap supplies power to both groups of window heaters 54a and 54b in parallel. Power is also supplied the duplicator resistors 69 and 70 since the thermostat 71 is closed and switch 104a is also closed through energization of relay 104. Resistors 69 and 70, however, soon bring the duplicator area temperature up to normal and usually in excess of normal so that the thermostat 71 opens to open the circuit through relay 104, and relay switch 104a opens, thus breaking the circuit of duplicator resistor 70 and also that of the window heaters 54a. The temperature of the windows now drops since only one group of heaters, namely, 54b are operative. The reduction of heat effect by elimination of resistor 70 in the duplicator also brings about closure of the thermostat 71, whereupon relay switch 104a is again closed and window resistors 54a reinstated. This on and off modulation of the window heating around the 70° point of external temperature continues indefinitely to maintain an average value of comfort for the occupants of the enclosure.

Should the outside temperature drop to 45° or less, external thermostat 99 becomes operative and relay switch 102a opens and switch 102b closes, thereby energizing relay 125 in the 111 circuit and closing the intermediate tap switch 125c to supply increased heating power to the window resistors 54a and 54b. The opening of switch 102a in the circuit of thermostat 98 deenergizes circuit 110 and opens switch 115c. Similarly for this increased heating supply, the duplicator causes modulation above the point of comfort as determined by the duplicator resistor 80.

On the further drop of external temperature to 25° or less, relay 101 is energized to open switch 101a and close switch 101b, whereby relay 128 in the 112 circuit closes power relay 128b (switches 115c, 125c being now open) to supply to the window heaters the maximum power available in the heating transformer. Modulation between all or part of the window resistor heaters is carried on under this third power condition as with the other conditions.

Modulation of voltage alone may be secured by moving the ganged switches 116, 126, 137 and 76 to the left position. In this alternative position it is apparent that the window heaters 54a are permanently excluded from the circuit by opening the conductor 74 but since voltage modulation will be applied to the remaining heaters 54b, these will be sufficient. If desired, both heaters 54a and 54b may be kept in circuit in parallel during voltage modulation by small alterations of the circuit in conductor 74, as by eliminating the switch 76 and making a through connection here. Also a series connection may be readily provided. Voltage modulation is secured in this alternative arrangement by shifting the voltage taps of the power supply through alternate engagement of power switches 115c, 125c and 128b.

The operation for this modified modulation is as follows. With outside temperatures above 70° F., that is, as in the $a$ condition as previously defined, relay switches 101b, 102b and 103a remain open and no modulation occurs. However, as soon as the outside temperature drops below 70° F. as in conditions $c$ and $d$, followed by the closure of relay switch 103a, a circuit is established through relay switch 104b by energization of relay 104 in circuit with the duplicator thermostat 71, relay switch 104c opening to restrict the current flow to the branch circuit 110. Relay 115 thereupon closes transformer power switch 115c to obtain the lowest tapped voltage on the window group resistors 54b. At the same time resistor 70 in the duplicator is supplying heat to the thermostat and if the $d$ condition applies, it eventually opens the same, deenergizing relay 104. Whereupon relay switch 104b opens and switch 104c closes, thus opening power switch 115c and breaking the heating current supply to the windows. Accordingly, the temperature at the duplicator thermostat 71 drops and on contact of the same, relay 104 is again energized and the cycle is repeated.

On a drop of outside temperatures to 45° or under, external thermostat 99 closes, closing switch 102b of circuit 111, energizing relay 125, since relay switch 104d is closed by the duplicator thermostat, and closing power switch 125c. This is followed by a gradual heating of the thermostat 71 in the duplicator until this switch opens and relay 104 is deenergized. Whereupon power switch 125c opens and the heating current in the window resistors is restored to switch 115c. This is due to the fact that while switch 104d opens to deenergize relay 125, switches 104c and 125a close, thus reenergizing relay 115 through switch 126.

In the case of temperature drop below 25° F., external thermostat 100 closes, energizing relay 101, opening switch 101a and closing switch 101b, whereupon relay 128 is energized for circuit 112 thereby closing power switch 128b and supplying to the window heaters the maximum current from the heating transformer. The duplicator modulates by the action of the resistor 69 and thermostat 71 as in the case of the other circuits 110 and 111. That is, the operation of relay 104 and its switches 104e and 104f, modulates between power switches 128b and 125c.

It is apparent in accordance with the above description that the circuit provides a modulation of the window heating from one to two groups of resistors or alternatively a modulation of a single group of window resistors with current variation therein so that accommodation may be made for various rates of change of external temperatures to insure a reasonable condition of comfort at the windows of the enclosure.

In describing the arrangement of the heat supply, as hereinabove stated, restriction is made to window heating. However, it is obvious that the principle of use may be applied to any restricted area of an enclosure and in fact, the circuit arrangement may be employed to maintain a general heating condition throughout the entire space of the enclosure, it is also obvious that under widely varying conditions and requirements of room heating, a separation of area heating, such as that of windows, from space heating of the general interior of an enclosure of which the areas are a part of the wall structure may be desirable. Accordingly, it is within the scope of the invention to provide joint control means for both space and area heating for a connection as will now be described with special reference to Fig. 6 of the drawing.

In Fig. 6, the apparatus and circuit of Fig. 5 is duplicated except for the addition of modulating means for the space temperature inside the enclosure. There is utilized apparatus described in my copending application, above referred to, for determining the approximate space temperature inside the main enclosure or room. This apparatus is designated a radiastat 160 and consists of a receptacle or shell 161 which may be hemispherical in contour and which is coated with a dull black material in order to secure maximum absorption of radiation in accordance with the principles of black body heat measurement. Inside of this shell is placed a fixed temperature thermostat 162 having normally opened contacts. A resistor 163 also is positioned in the receptacle, the function of which is to maintain the temperature adjacent the thermostat at approximate body surface temperature or 80° F. The resistor 163 is in series with fixed resistors 164, 165, 166 and 167 and variable resistor 168 in order to control the current flow in radiastat resistor 163 to establish the appropriate heating condition therein. Resistors 165 and 166 are provided with bypass circuits, including normally opened relay switches 103b and 169g, respectively. This radiastat resistor circuit is connected in parallel with the duplicator thermostat circuit 80—81 and the relay coil 86 and receives supply from the alternating current source 82 through switch 83. The thermostat 162 of the radiastat is also included in a circuit parallel with relay 86, there being a relay coil 169 in series with the thermostat.

Modification of this heat control circuit over the circuit arrangement of Fig. 5 consists in the addition of a circuit 170 extending from a point 171 in branch circuit 110 below the manual switch 116 transversely to the right to connect with the conductor 172 leading to a point 173 on the main circuit conductor 92. Included in the horizontal section of this circuit are normally open relay switch 169a, normally closed relay switch 169b, normally open relay switch 169c, normally closed relay switch 169d, and normally open relay switch 169e, connected in order of reference in series from the left to the right. The conductor 172 includes a relay coil 174 and, in order between the relay coil and point 173, normally closed relay switches 179a and 176a. From a point 175 between switches 169a and 169b in the horizontal section of circuit 170, a conductor leads through relay coil 176, normally closed relay switch 179b and normally closed relay switch 174a to point 177 on the main conductor 92. From a point 178 intermediate relay switches 169c and 169d, a conductor 178a leads through the relay coil 179, normally closed relay switch 176b and normally closed switch 174a to point 177. This described circuit 170 controls the voltage modulation of the heating transformer in relation to the heating elements in the panels of the enclosure and in arrangement it coincides generally with the voltage modulating network employed for control of the window heating.

In addition to the automatic relay control means for panel heating, as above described, there is included manual means for bypassing the automatic mechanism, utilization being made in substitution of the manual switch 114 of Fig. 5, a modified switch 114′. This switch unit includes a movable arm 181 pivoted at 182 so as to make contact with the automatic circuit at terminal 183 and contacts 184, 185 and 186 for establishing bypass circuits through the various relay control coils 176, 179 and 174. On the movable arm 181 is mounted a slide contact 187 which is insulated from the arm and free of all external contacts at the 183 contact position. In the other positions of the switch, however, the slide contact 187 bridges slide plates 188 and 189 to establish a circuit directly to the manual switch 147 of the manual window control, as shown in Fig. 5, as well as Fig. 6. By this means at terminal position 183, manual circuit connection to both window and panel heaters is broken.

In addition to the transformer voltage modulation for the panels and the radiastat circuit, the arrangement of Fig. 6 includes also a heat accelerator arrangement to speed up the heating action of the system when utilized in connection with a cold car or enclosure. This speed-up apparatus is included in the voltage modulating circuit. Normally closed thermostat 190 in series wtih the normally opened relay switch 191a is connected in parallel with the external thermostat 100. This thermostat 190 is placed within the enclosure. In parallel across both the external thermostat 100 and the corresponding relay 101 is a branch circuit including relay 191, normally open switch 169f and manual switch 192. This circuit between the manual switch 192 and relay switch 169f is connected to the circuit of thermostat 190 between the thermostat and switch 191a.

As shown in the load circuit, heaters 193 are installed in the panels 194 of the enclosure for heating the same. Any number of these heaters may be employed and connected in parallel between the main 75 of the heating transformer secondary 55 and the main 56a of this circuit. The transformer secondary taps employed in the window heater system are used for connections to the bank of panel resistors, three parallel tapped connections being shown with included relay switches 174b, 179c and 176c. This system also may include the refrigerator or cooling circuit and apparatus, as shown also in connection with Fig. 5 and described hereinafter.

The operation of the circuit of Fig. 6, as regards the window heating, is initially the same, but certain interrelations are involved inasmuch as both panel and window heating are dependent upon external temperature conditions for operation. Briefly considered, manual switches 91, 51 and 83 are closed, the gang switches 116, 126, 137 and 76 moved to the left and the manual switch 114' closed to contact 183. The manual switch 192 is then closed. Assuming the enclosure temperature is in a comfort range above 70°, the integration of radiant and convection heat effecting the radiastat 160 may not be sufficient in conjunction with the resistor 163 to close the thermostat 162. Consequently, the relay coil 169 is not energized and relay switch 169f in the accelerator circuit remains open. Also the thermostat 199, which is adapted to open at some selected temperature as 70° F., remains open. Consequently, there is no effect on manipulation of manual switch 192 and the wall panels remain unheated.

Should, however, the temperature drop below 70° F. externally of the enclosure, thermostat 98 will close, thereby closing switch 103a in the modulating circuit, causing window heating, as before, and conditioning the modulating circuit for functioning for wall panel heating in the event that the internal spaced temperature of the enclosure falls to a point to close the thermostat 162 of the radiastat. When this occurs, radiastat relay coil 169 operates corresponding relay switches 169a, b, c, d and e, closing tap switch 176c of the heating transformer and applying heating current to the panel resistors 193. The manual switches 193a therefor are closed. If initially the temperature within the enclosure is below 70°, the thermostat 199 will be closed and speed of action of the heating means will be accelerated by closing the manual switch 192. Thereupon, since switch 169f is closed, the relay 191 is energized. Switch 191a being closed by relay 191, relay coil 101 is energized, and this results in application of the maximum voltage of transformer 53 through relay switch 174b to the panels. The immediate opening of the manual switch 192 as soon as released permits complete separation of this circuit from the main circuit as soon as the radiastat operates to open the thermostat 162 through elevation of temperature within the enclosure, thereby deenergizing relay 169 and opening its switch 169f in the circuit of relay 191.

The modulation action of relay coil 169 with its related switches 169a, b, c, d and e, and relays 176, 179, 174, for the heating panels is identical to that of relay coil 104 in the window heaters as applied to the corresponding relay switches 104b, c, d, e, and f and relays 115, 125 and 128.

The description to this point has pertained to a heating system for a room or other enclosure, assuming external temperatures normally at or below a comfort temperature. Reference will now be made to apparatus for cooling an enclosure when external temperatures are above the comfort temperature, as prevail in summer months.

This apparatus is applicable not only to the single duplicator control of Fig. 5, but also to the combined duplicator and radiastat control of Fig. 6, but will be described only in connection with Figs. 5 and 7.

At the right of Fig. 5 is diagrammatically indicated a refrigerating unit 200. Included in this unit are a heat exchanger 201, a pump 202, cooling coils 203, these elements being connected in series, and a bypassing valve unit 204 connected around the pump and heat exchanger and adapted to bypass coolant from the coil 203 under certain conditions of use. The cooling coils may be located in the duct which supplies air to the car. A heater may also be placed in the duct and may be controlled thermostatically in a similar way. When the car is heated by radiant panels, the air in the duct is kept relatively cool, say about 60 to 65° F. The temperature may be regulated according to inside temperatures but for very cold weather may additionally be modulated for different outside temperatures. The heater may consist of finned heating rods or finned fluid heated tubes.

The valve unit 204 (Fig. 7) contains chambers 205 and 206 separated by a partition 207 in which a lift valve head 208 is placed. The valve stem 209 is attached to an end of a gas containing expansible cylinder 210 which may be of a type having a flexible corrugated wall (a so-called "Sylphon" bellows). The other end of the cylinder is fixed to the casing 211. Within the casing and surrounding the cylinder is a heater coil 212 having connection in series in a circuit 213 to the normally open relay switch 105a and current source 214. A section 215 of the cooling coil passes into the duplicator 67. Relay switch 105a is actuated by relay 105 hereinabove referred to, this relay in turn being dependent upon the normally open duplicator thermostat 106 for functioning.

In operation, should external temperatures exceed a predetermined set value of comfort as 80° F., such as to cause closure of normally open thermostat 106 in the duplicator, relay 105 is energized and operates to close switch 105a; and thus heat is applied to cylinder 210 to cause the valve 208 to close. With the valve 208 closed, refrigerating coolant is pumped through the main cooling coils 203 including section 215. When the duplicator temperature drops below the set temperature, thermostat 106 opens, relay 105 is deenergized, switch 105a opens, and the cylinder 210 cools and opens valve 208 thereby bypassing the coolant from the refrigerating coils. Thereafter the cooling cycle is repeated.

It follows from the above description that the duplicator unit may be a major controlling element for space and area heating, as well as for space cooling. It also appears that while each function requires specific separate means, the control stems from common elements so that a common relationship exists.

The window and panel heating, as described above, is in part independent and in part dependent upon common functioning means, such as the external thermostats 98, 99 and 100, and the temperature accelerator circuit. Together, the combined circuits insure adequate space heating within the interior of an enclosure and adequate area heating, such as that for windows in the wall of the enclosure, so that complete heating comfort may be obtained.

It is pointed out that while the area heating has been described as supplemental particularly in the showing of Fig. 6, the area heating arrangement may be utilized under certain conditions alone as a source of temperature supply. This arises from the fact that internal temperature of the duplicator is normally maintained at an ideal state of comfort by means of the various resistors and other special heating means combined with the insulated walls. By proper calibrating methods, deviations from this ideal temperature, as brought about by effect of external temperature upon a single external wall of the duplicator which is common to the room wall, may control with satisfactory accuracy heating elements placed in panels and the like for the interior of the main room which is to be heated. This duplicator may not necessarily be a part of the heated enclosure but spaced therefrom if installation conditions require. Also, while resistor heating means has been described as the specific preferred means of heating the duplicator to attain the ideal temperature therein, other means, such as the channeling of air from the interior of the enclosure to be heated through the duplicator, may be employed.

By the term "duplicator" is meant a unit which has attributes which duplicate those of a related unit, i. e. temperature conditions.

Other modifications of the invention will occur to those skilled in this art such as will develop in connection with specific installations; and hence, no limitations are implied in the diagrammatic showing other than may be required by the scope of the claims hereto appended.

What is claimed is:

1. In a room heating system, a walled enclosure, means including radiant heating means for heating the interwall space between the walls, separate means for heating limited areas on said walls, a source of electric current for supplying power to said heating means, separate control means interposed between said source and each of said space and area heating means, means responsive to temperatures external to said enclosure for energizing said controls to secure changes in the amount of power supplied each of said heating means, and means for modulating separately the supply of power to each of said space and area heating means; the means for modulating the supply of power to said first-mentioned heating means including a device responsive to both radiant and air heat, and the means for modulating the power to said limited area heating means including means artificially maintaining conditions simulating conditions existing at said limited area.

2. A system for the heating of the interior of a walled room comprising a source of heating energy, means including radiant heating means for supplying heat to the interwall room space, means for supplying heat to special wall areas, means for indicating the general room space temperature, means for indicating the special area temperature, means responsive to temperatures external to said enclosure for controlling supply of heating energy from said source, and modulating means subject to the temperature indications of the space and area indicators respectively for varying the supply of the heat source at predetermined values of the external temperature responsive means, the means for modulating the supply of power to said first-mentioned heating means including a device responsive to both radiant and air heat, and the means for modulating the power to said limited area heating means including means artificially maintaining conditions simulating conditions existing at said limited area.

3. In a room heating system, a walled enclosure, means for heating the interwall space between the walls, separate means for heating limited areas on said walls, a source of electric current for supplying power to said heating means, separate control means interposed between said source and each of said space and area heating means, means responsive to temperatures external to said enclosure for energizing said controls to secure changes in the amount of power supplied each of said heating means, and means for modulating separately the supply of power to each of said space and area heating means, said area modulating means comprising a duplicator having enclosing walls with one wall external to the enclosure, means for maintaining the internal duplicator temperature approximately at that of the comfort temperature of the enclosure space, and a thermostat adjacent the external wall of the duplicator adapted to energize power apparatus on deviation of the temperature from said comfort temperature whereby modulation of the heat supply to the wall areas is obtained.

4. In a heating system for walled room windows, means for supplying heat to the windows, a control window, separate means for heating said window to a predetermined temperature, a heat insulating enclosure between said control window and room, a temperature control element adjacent said control window sensitive to temperature conditions external thereto and to the room, temperature modulating means for variation of heat supply to said room windows connected to said room window heat supply, and energizing connections between said control element and temperature modulating means for making said modulating means effective with variation in temperature conditions at said control window.

5. In a heating system for walled room windows, wall windows having heating means, a control window, separate heating means for heating the control window to a predetermined temperature, a heat insulating enclosure between said control window and room, a temperature control element adjacent said control window sensitive to temperature conditions external to said control window and room, major and minor temperature modulation means for variation of said heat supply to said windows connected to said room window heat supply, operating connections between said window control element and both modulating means, and means for making said operating connections effective selectively for either the major or minor temperature modulation.

6. In a combined heating and refrigerating system, a first enclosure, means for heating said enclosure, means for cooling said enclosure, a second enclosure heat insulated from said first enclosure, having an external wall common with that of said first enclosure, heat sensitive means external to both of said enclosures for energizing said first enclosure heating means, means for heating said second enclosure to a predetermined temperature, means responsive to the temperature near the center of said second enclosure for controlling the supply of heat thereto, means in said second enclosure operative on a drop of temperature adjacent the external wall thereof below said predetermined temperature for increasing heat flow of said first enclosure heating means, and control means in said second enclosure for initiating coolant flow in said cooling means on increase of temperature in said second enclosure above said predetermined temperature.

7. In a heating system for walled room windows, means for supplying heat to the windows, a control window of like glazing as the room windows and having the outer surface exposed to outside temperature conditions, separate means for heating the inside space near said control window to a predetermined temperature, a heat insulating enclosure between said control window and room, a temperature control element within said enclosure and adjacent said control window sensitive to temperature conditions external thereto as manifested through the window glazing and to temperature conditions of the room as manifested within said enclosure, temperature modulating means for variation of heat supply to said room windows connected to said room window heat supply, and energizing connections between said control element and temperature modulating means for making said modulating means effective with variation in temperature conditions at said control window.

8. In a heating system for walled room windows, wall windows having heating means, a control window of like glazing as the room windows and having the outer surface exposed to outside temperature conditions, separate heating means for heating the inside space near the control window to a predetermined temperature, a heat insulating enclosure between said control window and room, a temperature control element within said enclosure and adjacent said control window sensitive to temperature conditions external to said control window as manifested through the window glazing and to temperature conditions of the room as manifested within said enclosure, major and minor temperature modulation means for variation of said heat supply to said windows connected to said room window heat supply, operating connections between said window control element and both modulating means, and means for making said operating connections effective selectively for either the major or minor temperature modulation.

9. In a room heating system, means for supplying heat to the room space, means for supplying heat to a group of limited areas of the external room wall, a separate limited area in said wall, means for heat-insulating said separate wall area from the room space to form an area enclosure, means for establishing a normal space temperature at said separate area enclosure duplicating ideal comfort temperature of said room space, a first means responsive to the temperature of an inner portion of said enclosure for regulating the application of heat thereto, and a second means responsive to the temperature in an outer portion of said enclosure and separate from the first said enclosure temperature responsive means for controlling heat supply to the group of areas in accordance with change of temperature of said separate area and enclosure as modified by external temperature variation.

10. In a heating system, a first enclosure, means for heating said enclosure, a second enclosure heat-insulated from said first enclosure having an external wall common with that of said first enclosure, means for heating said second enclosure to an arbitrary temperature, a first means responsive to the temperature of an inner portion of said second enclosure for regulating the application of heat thereto, and a second means responsive to the temperature in an outer portion of said enclosure and separate from the first said enclosure temperature responsive means operative on a deviation of the temperature of the external wall of said second enclosure from said arbitrary value for energizing heating means in said first enclosure and also near said temperature responsive means in the second enclosure whereby a common temperature variation of both enclosures is secured.

11. In a heating system, an outer enclosure, means for heating said enclosure, an inner enclosure heat-insulated from said outer enclosure having an external wall common with that of said outer enclosure, means for heating said inner enclosure to an arbitrary temperature, a first means responsive to the temperature of an inner portion of said inner enclosure for regulating the application of heat thereto, and a second means responsive to the temperature in an outer portion of said enclosure and separate from the first said enclosure temperature responsive means operative on deviation of the temperature of the external wall of said inner enclosure from said arbitrary value for energizing heating means in said inner enclosure and also near said temperature responsive means in the outer enclosure whereby a common temperature variation of both enclosures is secured.

EDWIN M. CALLENDER.

REFERENCES CITED

The following references are of record in the file of this patent:

UNITED STATES PATENTS

| Number | Name | Date |
| --- | --- | --- |
| 2,107,523 | Coe | Feb. 8, 1938 |
| 2,168,178 | Thompson | Aug. 1, 1939 |
| 2,176,001 | Jennings | Oct. 10, 1939 |
| 2,176,002 | Jennings | Oct. 10, 1939 |
| 2,182,449 | Parks et al. | Dec. 5, 1939 |
| 2,192,144 | Miller | Feb. 27, 1940 |
| 2,298,810 | Shivers | Oct. 13, 1942 |
| 2,425,797 | Gillespie | Aug. 19, 1947 |